US007552541B2

(12) United States Patent
Sakurai et al.

(10) Patent No.: US 7,552,541 B2
(45) Date of Patent: Jun. 30, 2009

(54) POINTING DEVICE

(75) Inventors: Satoshi Sakurai, Shinagawa (JP); Nobuo Yatsu, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 289 days.

(21) Appl. No.: 11/181,892

(22) Filed: Jul. 15, 2005

(65) Prior Publication Data

US 2006/0010700 A1 Jan. 19, 2006

(30) Foreign Application Priority Data

Jul. 15, 2004 (JP) ............................ 2004-209161

(51) Int. Cl.
*G01C 17/38* (2006.01)

(52) U.S. Cl. ...................................... 33/355 R; 33/356

(58) Field of Classification Search ............... 33/335 R, 33/356, 361
See application file for complete search history.

(56) References Cited

U.S. PATENT DOCUMENTS 4,402,142 A * 9/1983 Dinsmore .................... 33/348
5,157,841 A * 10/1992 Dinsmore .................... 33/361
5,168,221 A * 12/1992 Houston ...................... 33/1 M
5,517,430 A * 5/1996 Lewis ......................... 33/364
5,525,901 A * 6/1996 Clymer et al. ............ 33/355 R
5,749,150 A * 5/1998 McDermott .................. 33/361
5,879,297 A * 3/1999 Haynor et al. .............. 600/407
7,016,263 B2 * 3/2006 Gueissaz et al. .............. 368/10
2005/0016006 A1 * 1/2005 Sasagawa ................. 33/355 R
2005/0283988 A1 * 12/2005 Sato et al. ...................... 33/356
2006/0012572 A1 * 1/2006 Sakurai et al. ............. 345/157
2006/0050053 A1 * 3/2006 Takatsuka ................... 345/156
2008/0250661 A1 * 10/2008 Kou et al. ..................... 33/356

FOREIGN PATENT DOCUMENTS

JP 6-59811 3/1994

* cited by examiner

*Primary Examiner*—Yaritza Guadalupe-McCall
(74) *Attorney, Agent, or Firm*—Staas & Halsey LLP

(57) ABSTRACT

A pointing device includes hall elements that detect inclinations of a magnet in first, second and third directions, and a control unit that determines a pointing direction with output voltages of the hall elements depending on the inclinations of the magnet.

4 Claims, 10 Drawing Sheets

POINTING DEVICE

BACKGROUND OF THE INVENTION

1. Field of the Invention

This invention generally relates to pointing devices, and more particularly, to a pointing device designating coordinate positions in a three-dimensional space of directions of height, width, and depth.

2. Description of the Related Art

A pointing device that physically moves in three-axis directions is demanded for pointing a position in the three-dimensional space of an x-axis direction, a y-axis direction, and a z-axis direction displayed on a display screen. Japanese Patent Application Publication No. 6-59811 (hereinafter referred to as Document 1) disclose a device that detects a movement amount in the z-axis direction, based on a rotational amount of two spheres in the x-axis direction, another rotational amount in the y-axis direction, and a difference in these rotational amounts.

The pointing device that physically moves in three axis directions, however, has a complicated configuration as compared to that of the pointing device that physically moves in two axis directions. There arises a problem in that the device cost is more expensive because of the complicated configuration. Document 1 also describes a mechanism of detecting the movement amount in the z-axis direction with the rotational amount of the two spheres. This also complicates the configuration more.

SUMMARY OF THE INVENTION

The present invention has been made in view of the above-mentioned circumstances and provides a pointing device having a simple structure to point an object displayed in three dimensions.

According to one aspect of the present invention, preferably, there is provided a pointing device including hall elements that detect inclinations of a magnet in first, second and third directions, and a control unit that determines a pointing direction with output voltages of the hall elements depending on the inclinations of the magnet.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1:
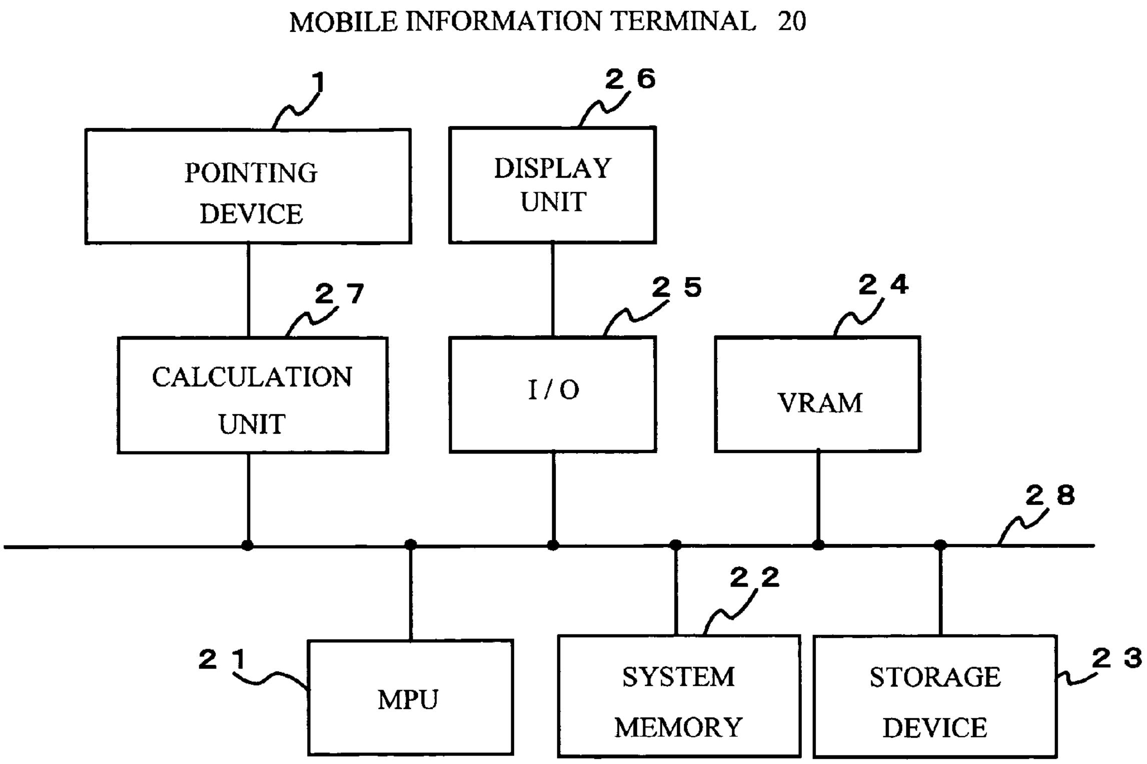
FIG. 1 shows a configuration of a mobile information terminal.

A description will be given, with reference to drawings, of a first embodiment of the present invention. FIG. 1 shows a system architecture in which the present invention is applied to a mobile information terminal 20 of a PDA (Personal Digital Assistant) or the like. Referring to FIG. 1, the mobile information terminal 20 includes a pointing device 1, an MPU (Micro Processing Unit) 21, a system memory 22, a storage device 23 such as a hard disc drive, a VRAM (Video RAM) 24, an I/O unit 25, a display unit 26, and a calculation unit 27.

The MPU 21 reads out and executes a program stored in the system memory 22. The MPU 21 executes an operating system and an application program stored in the system memory 22, and provides a graphical user interface with which it is easy to execute the file operation and activate application software by selecting an icon displayed on a display screen. The operating system includes cursor display capabilities and focus movement capabilities.

The system memory 22 is composed of a ROM that stores the system information and a RAM used for a temporary storage of the MPU 21.

The storage device 23 stores the above-mentioned operating system and application programs. The operating system and application programs are loaded onto the system memory 22 and are executed by the MPU 21. The GUI provided by the application program is realized with graphic images such as button and pull-down menu, which are also stored in the storage device 23 in advance.

The VRAM 24 stores images of one screen to be displayed on the display unit 26. The images stored in the VRAM 24 are transmitted to the display unit 26 in a certain cycle by the MPU 21 or a direct memory access controller, not shown, by way of the I/O unit 25. The MPU 21 creates a new image and writes in the VRAM 24 every time the image displayed on the screen needs to be changed, for example, when a mouse cursor is moved.

Here, a description will be given of the principle of the pointing device 1. The pointing device 1 in accordance with the present invention makes it possible to manipulate the cursor in every direction of 360 degrees on the screen with the use of a magnetic change.

Figure 2:
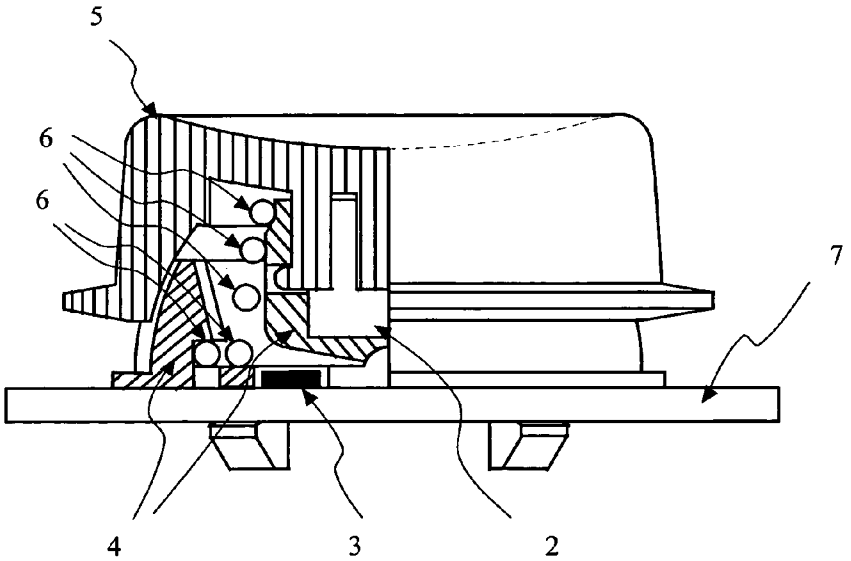
FIG. 2 is a view showing the configuration of a pointing device.
Figure 3:
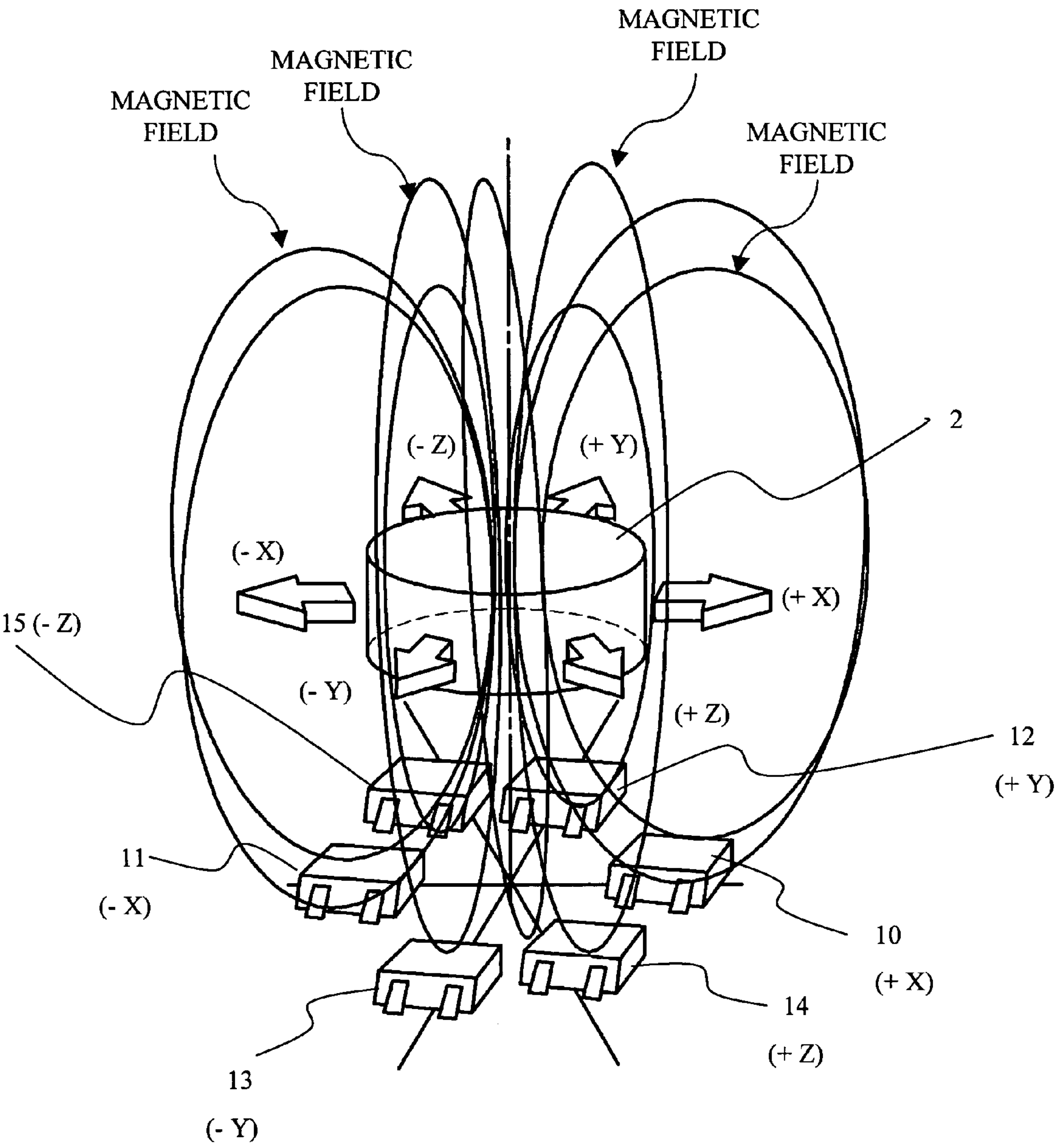
FIG. 3 is a view illustrating the principle of the pointing device.

Referring to FIG. 2, the pointing device 1 that employs the magnetic change is arranged in a housing 4, and includes a manipulation unit, not shown, a magnet 2, and a hall element 3. The magnet 2 moves together with the manipulation unit. The hall element 3 detects an inclination or movement of the magnet 2. A key top 5 is provided to cover the housing 4 on the housing 4 in which the magnet 2 is included. The key top 5 is supported by a spring 6 so that the key top 5 can move up and down.

Figure 4:
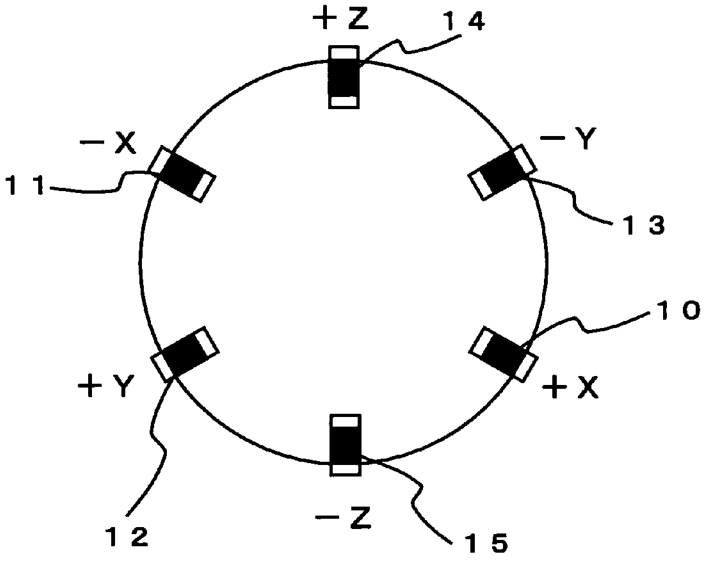
FIG. 4 shows an arrangement of hall elements in accordance with a first embodiment of the present invention.

The hall element 3 converts a magnetic field into a voltage, and outputs the voltage. Referring to FIG. 4, hall elements are arranged symmetrically with respect to a given reference point on a printed board 7. Six hall elements are arranged at 60-degree intervals on a circle's circumference in accordance with the present invention. Hall elements 10 (+X direction) and 11 (−X direction) are arranged in the X direction, hall elements 12 (+Y direction) and 13 (−Y direction) are arranged in the Y direction, and hall elements 14 (+Z direction) and 15 (−Z direction) are arranged in the Z direction.

The magnet 2 has a cylindrical shape, and the magnetic field is generated in a direction perpendicular to a bottom surface thereof. The magnet 2 is arranged equally spaced between each of the hall elements 10, 11, 12, 13, 14, and 15, if the pointing device 1 is not manipulated. The magnet 2 is arranged equally spaced between each of the hall elements 10, 11, 12, 13, 14, and 15, and accordingly the same magnetic field is applied in the hall elements 10, 11, 12, 13, 14, and 15. The same voltage values are output from the hall elements 10, 11, 12, 13, 14, and 15.

When the magnet 2 is operated to be inclined or moved, the magnetic fields applied to the hall elements 10, 11, 12, 13, 14, and 15 respectively vary and the voltage values output from the hall elements 10, 11, 12, 13, 14, and 15 also vary. For example, when the magnet 2 is inclined or moved in a positive X direction, the output voltage of the hall element 10 (+X direction) is larger than that of the hall element 11 (−X direction).

Outputs of the hall elements 10, 11, 12, 13, 14, and 15 thus vary, and signals are calculated so that an object to be operated on the display screen may be moved in an arbitrary direction in 360 degrees at an arbitrary rate. Here, a voltage output from the hall element 10 (+X) is set to (+Vx), the voltage output from the hall element 11 (−X) is set to (−Vx), the voltage output from the hall element 12 (+Y) is set to (+Vy), a voltage output from the hall element 13 (−Y) is set to (−Vy), the voltage output from the hall element 14 (+Z) is set to (+Vz), and the voltage output from the hall element 15 (−Z) is set to (−Vz). The pointing device 1 is operated, and consequently the position of the magnet 2 is changed and the voltages obtained by the six hall elements 10, 11, 12, 13, 14, and 15 are also changed.

Figure 5:
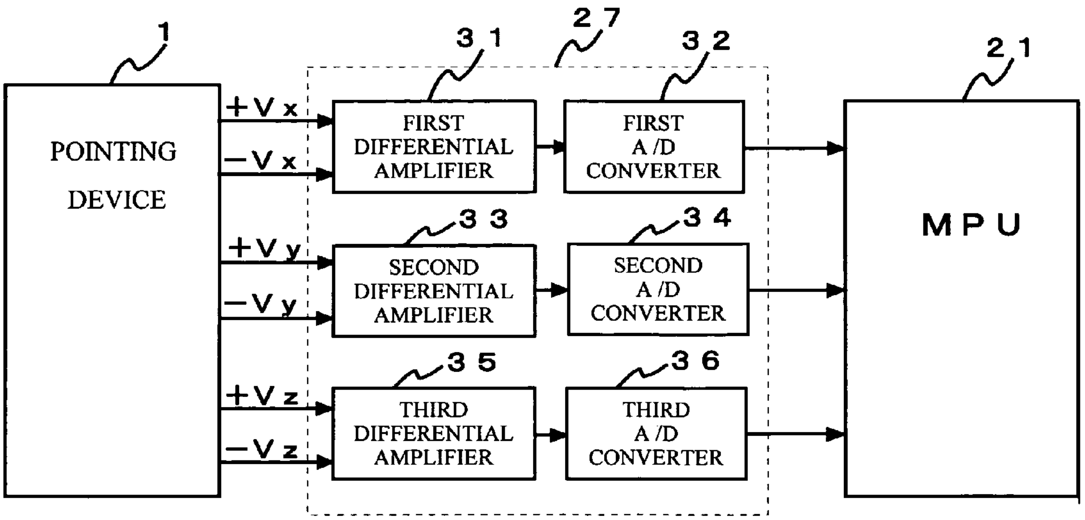
FIG. 5 shows a configuration of a calculation unit in accordance with the first embodiment of the present invention.

FIG. 5 shows a configuration of the calculation unit 27. The calculation unit 27 includes a first differential amplifier 31, a second differential amplifier 33, a third differential amplifier 35, a first A/D converter 32, a second A/D converter 34, and a third A/D converter 36. Inputs into the calculation unit 27 are the voltages (+Vx) and (−Vx) in the X direction, the voltages (+Vy) and (−Vy) in the Y direction, and the voltages (+Vz) and (−Vz) in the Z direction. The first differential amplifier 31 amplifies the difference between (+Vx) and (−Vx) and the first A/D converter 32 converts the output from the first differential amplifier 31 into a digital signal. The second differential amplifier 33 amplifies the difference between (+Vy) and (−Vy) and the second A/D converter 34 converts the output from the second differential amplifier 33 into the digital signal. The third differential amplifier 35 amplifies the difference between (+Vz) and (−Vz) and the third A/D converter 36 converts the output from the third differential amplifier 35 into the digital signal.

The MPU 21 detects a manipulation input into the cursor in the X, Y, or Z direction with an X pulse, Y pulse, or Z pulse output from the first A/D converter 32, the second A/D converter 34, or the third A/D converter 36.

Figure 6:
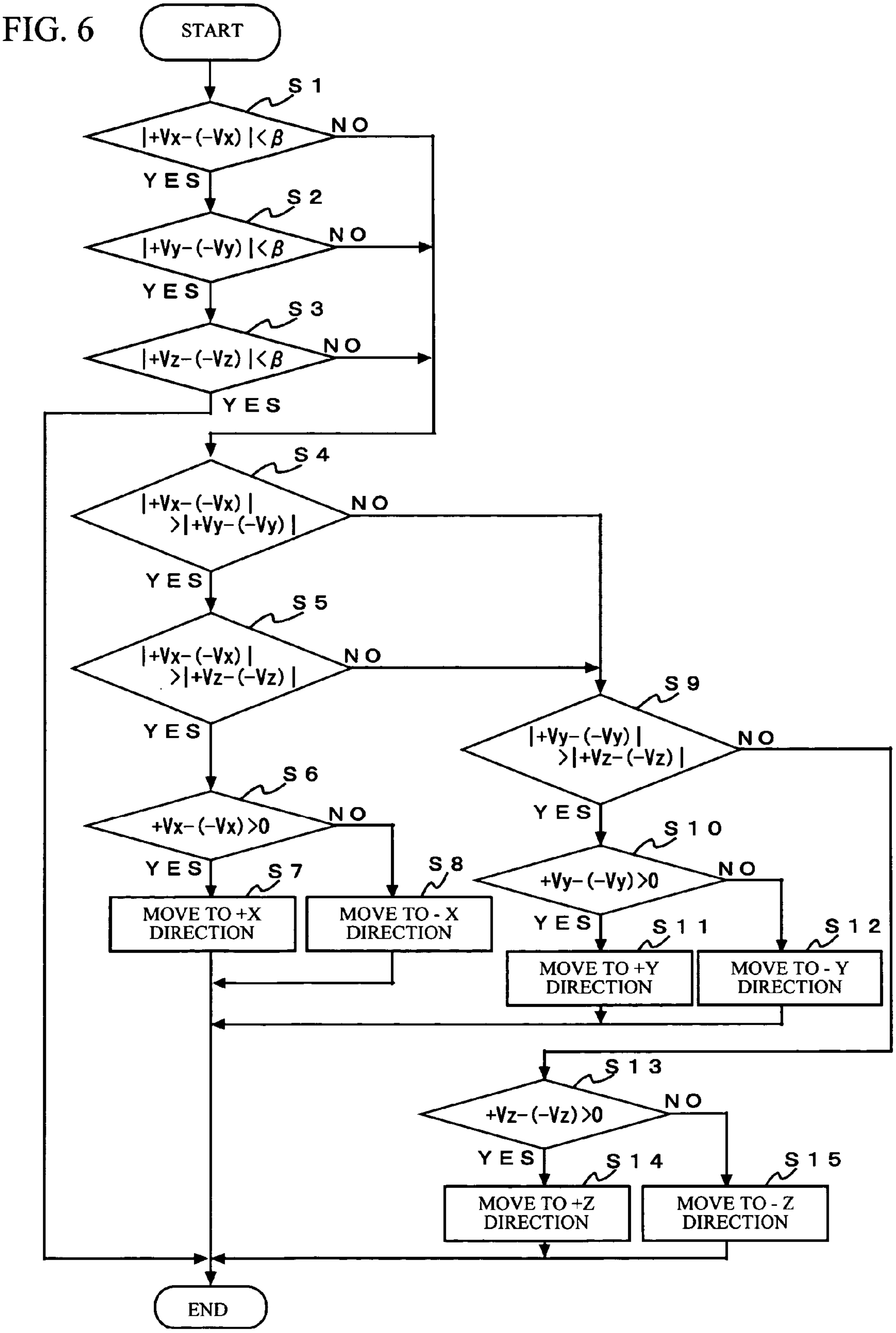
FIG. 6 shows a procedure of determining a manipulation input direction in accordance with the first embodiment of the present invention.

Next, a description will be given of a procedure of determining a manipulation direction with the output from the pointing device 1, with reference to a flowchart shown in FIG. 6. The output voltages (+Vx), (−Vx), (+Vy), (−Vy), (+Vz), and (−Vz) are converted into a digital data in the calculation unit 27. With this data, it is determined in which direction of the x-axis, y-axis, or z-axis direction the manipulation input has been made. A differential voltage value of the x-axis direction is set to |+Vx−(−Vx)|, the differential voltage of the y-axis direction is set to |+Vy−(−Vy)|, and the differential voltage of the z-axis direction is set to |+Vz−(−Vz)|. The MPU 21 compares the above-mentioned voltage values with a predetermined threshold β (in steps S1, S2, and S3) to determine whether the manipulation input has been made. If the manipulation input has not been made (Yes in step S1, Yes in step S2, and Yes in step S3), get out of the process.

If the manipulation input has been made, the manipulation direction is determined. First, compare the differential voltage of the x-axis direction |+Vx−(−Vx)| and the differential voltage of the y-axis direction |+Vy−(−Vy)| (in step S4). If the differential voltage of the x-axis direction is larger than that of the y-axis direction (Yes in step S4), compare the differential voltage of the x-axis direction |+Vx−(−Vx)| and the differential voltage of the y-axis direction |+Vz−(−Vz)| (in step S5). If the differential voltage of the x-axis direction is larger than that of the z-axis direction (Yes in step S5), the manipulation direction is determined to be the x-axis direction, and calculate +Vx−(−Vx) (in step S6) to determine whether the input has been made in the positive x-axis direction or negative x-axis direction. If +Vx−(−Vx) is a positive value (Yes in step S6), it is determined that the manipulation input has been made in the positive x-axis direction (in step S7). If +Vx−(−Vx) is a negative value (No in step S6), it is determined that the manipulation input has been made in the negative x-axis direction (in step S8).

In addition, if the differential voltage of the y-axis direction is larger than that of the x-axis direction (No in step S4), or if the differential voltage of the z-axis direction is larger than that of the x-axis direction (No in step S5), compare the differential voltage of the y-axis direction |+Vy−(−Vy)| and the differential voltage of the z-axis direction |+Vz−(−Vz)| (in step S9). If the differential voltage of the y-axis direction is larger than that of the z-axis direction (Yes in step S9), the manipulation direction is determined to be the y-axis direction, and calculate +Vy−(−Vy) (in step S10) to determine whether the input has been made in the positive y-axis direction or negative y-axis direction. If +Vy−(−Vy) is a positive value (Yes in step S10), it is determined that the manipulation input has been made in a positive y-axis direction (in step S11). If +Vx−(−Vx) is a negative value (No in step S6), it is determined that the manipulation input has been made in the negative x-axis direction (in step S12).

Further, if the differential voltage of the z-axis direction is larger than that of the y-axis direction (No in step S9), the manipulation direction is determined to be the z-axis direction, and calculate +Vz−(−Vz) (in step S13) to determine whether the input has been made in the positive z-axis direction or negative z-axis direction. If +Vz−(−Vz) is a positive value (Yes in step S13), it is determined that the manipulation input has been made in a positive z-axis direction (in step S14). If +Vz−(−Vz) is a negative value (No in step S13), it is determined that the manipulation input has been made in the negative z-axis direction (in step S15).

In this manner, it is thus possible to point the object shown in three dimensions with the pointing device used in two dimensions, in accordance with the present invention.

Figure 7:
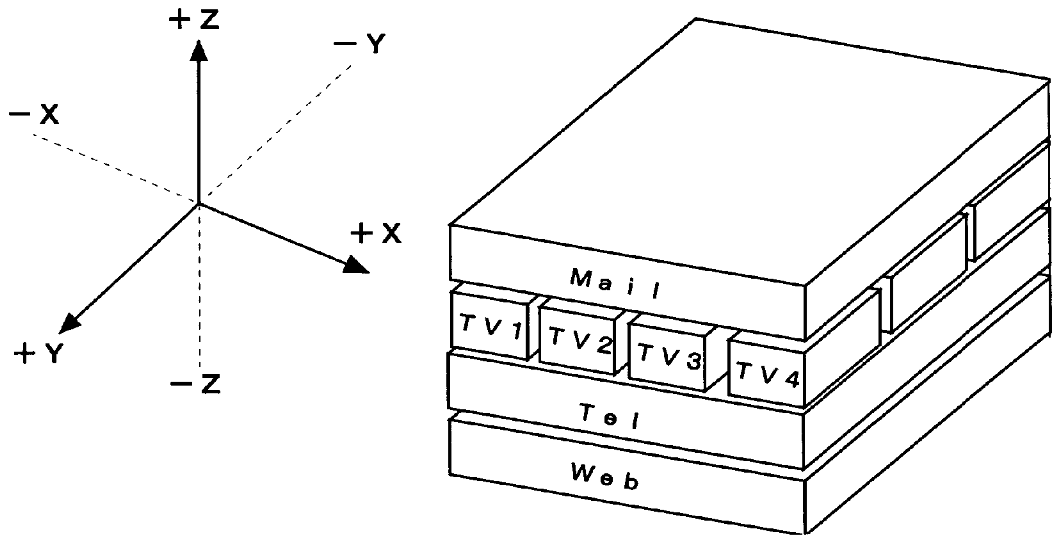
FIG. 7 is an example of a menu selection screen used for the pointing device.
Figure 8:
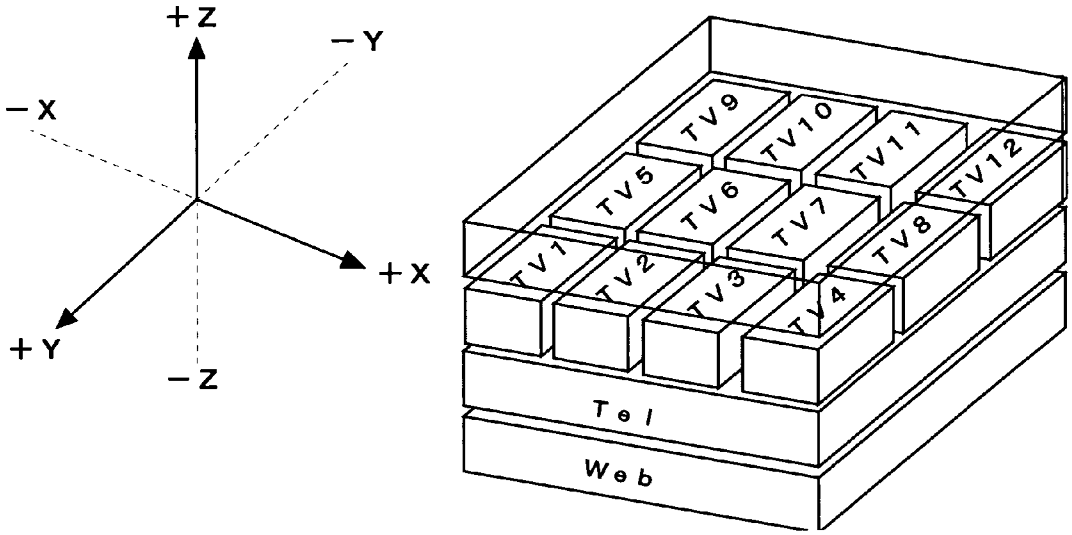
FIG. 8 is another example of the menu selection screen used for the pointing device.

Here, a description will be given of the pointing operation in detail. FIG. 7 is a menu selection screen displayed on a display screen of the display unit 26. For example, assuming that a mobile information terminal 1 includes capabilities of mail, TV, telephone, the Internet, and the like, the menu selection screen is displayed as shown in FIG. 7. On the menu selection screen, the capabilities included in the mobile information terminal 1 are displayed in blocks, and are piled up in the z-axis direction. A user manipulates the pointing device 1 in the z-axis direction and selects one of the capabilities. Here, assuming that the TV is selected. Then, a TV channel selection screen appears as shown in FIG. 8. The TV channel selection screen has the blocks for the respective TV channels arranged in the x-axis and y-axis directions. The user manipulates the pointing device and moves the cursor in the x-axis and y-axis directions to select a channel that the user likes to watch.

Figure 9:
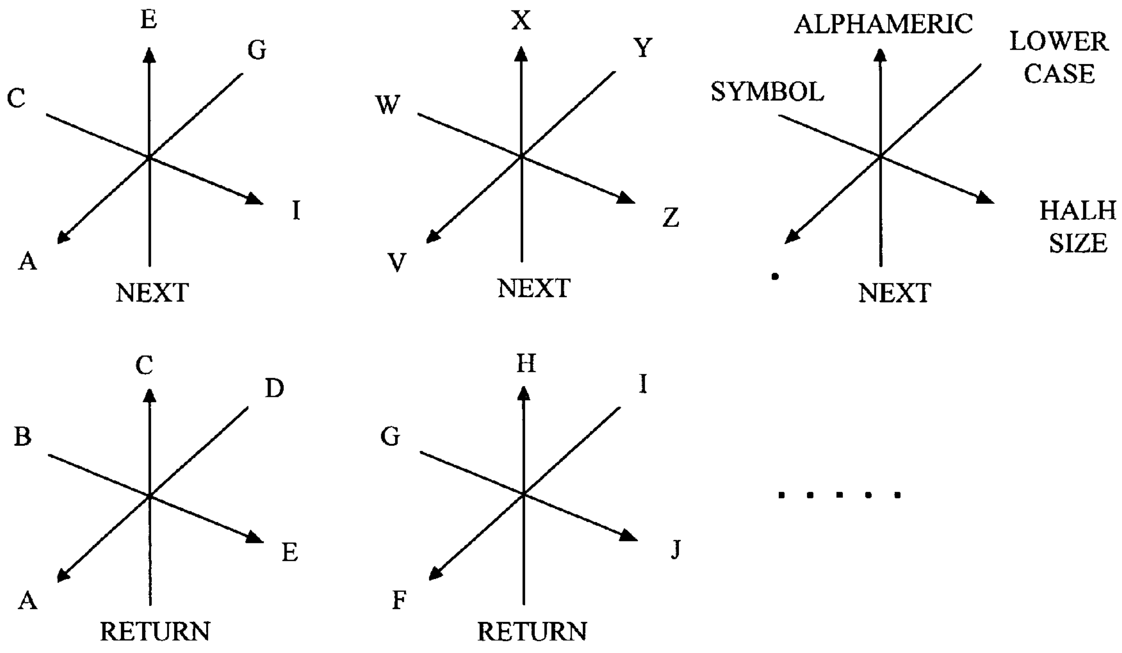
FIG. 9 is yet another example of the menu selection screen used for the pointing device.

FIG. 9 is an example of a case where characters are input by pointing. Input characters are respectively arranged in +X-axis, −X-axis, +Y-axis, −Y-axis, +Z-axis, and −Z-axis directions. The user selects and inputs the character by manipulating the pointing device 1.

Second Embodiment

Figure 10:
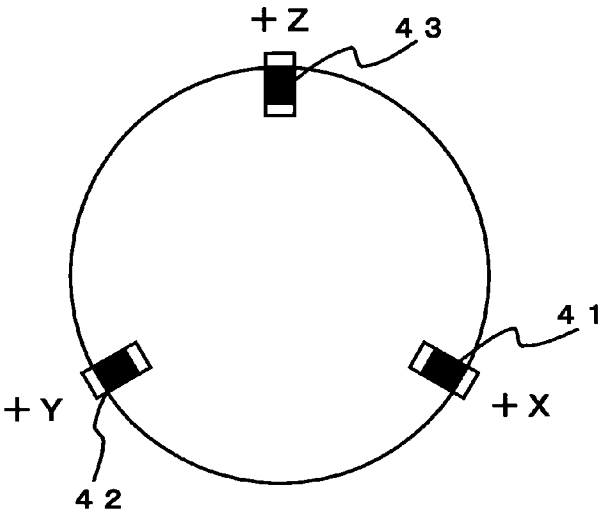
FIG. 10 shows another arrangement of hall elements in accordance with a second embodiment of the present invention.

Next, a description will be given of a second embodiment of the present invention. Referring to FIG. 10, three hall elements are arranged at 120-degree intervals on a circle's circumference. Three hall elements 41, 42, and 43 are assigned to the x-axis, y-axis, and z-axis.

Figure 11:
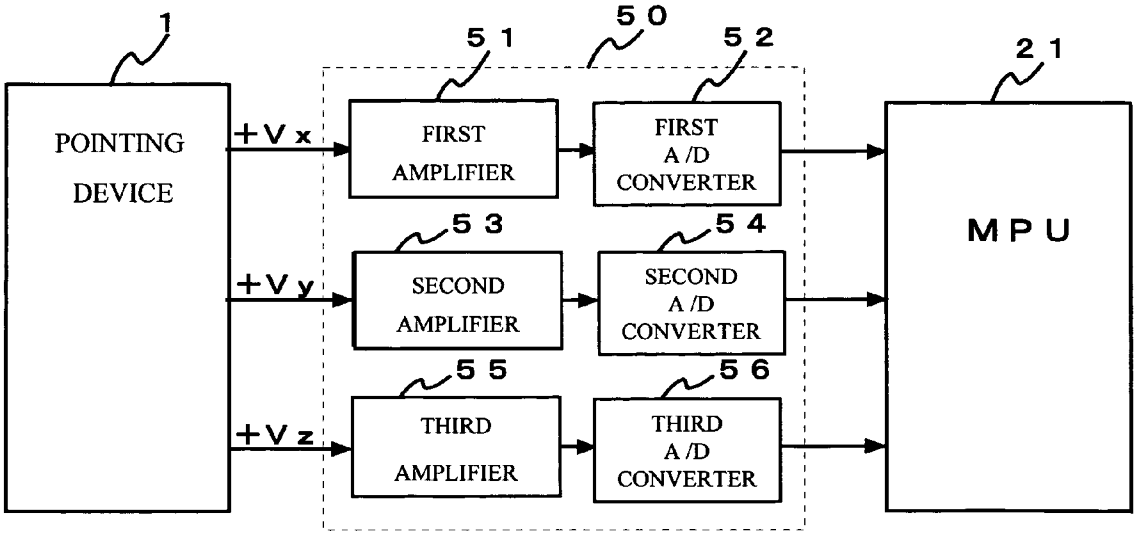
FIG. 11 shows a configuration of the calculation unit in accordance with the second embodiment of the present invention.

The voltage +Vx corresponding to the x-axis, the voltage +Vy corresponding to the y-axis, and the voltage +Vz corresponding to the z-axis are output from the pointing device 1. A calculation unit 50 in accordance with the second embodiment of the present invention has a different configuration from that in accordance with the first embodiment of the present invention. Referring to FIG. 11, the calculation unit 50 includes a first amplifier 51, a second amplifier 53, a third amplifier 55, a first A/D converter 52, a second A/D converter 54, and a third A/D converter 56. Inputs into the calculation unit 50 are the voltage (+Vx) in the X direction, the voltage (+Vy) in the Y direction, and the voltage (+Vz) in the Z direction.

The MPU 21 detects the manipulation input into the cursor in the X, Y, or Z direction with the X pulse, Y pulse, or Z pulse output from the first A/D converter 52, the second A/D converter 54, and the third A/D converter 56.

Figure 12:
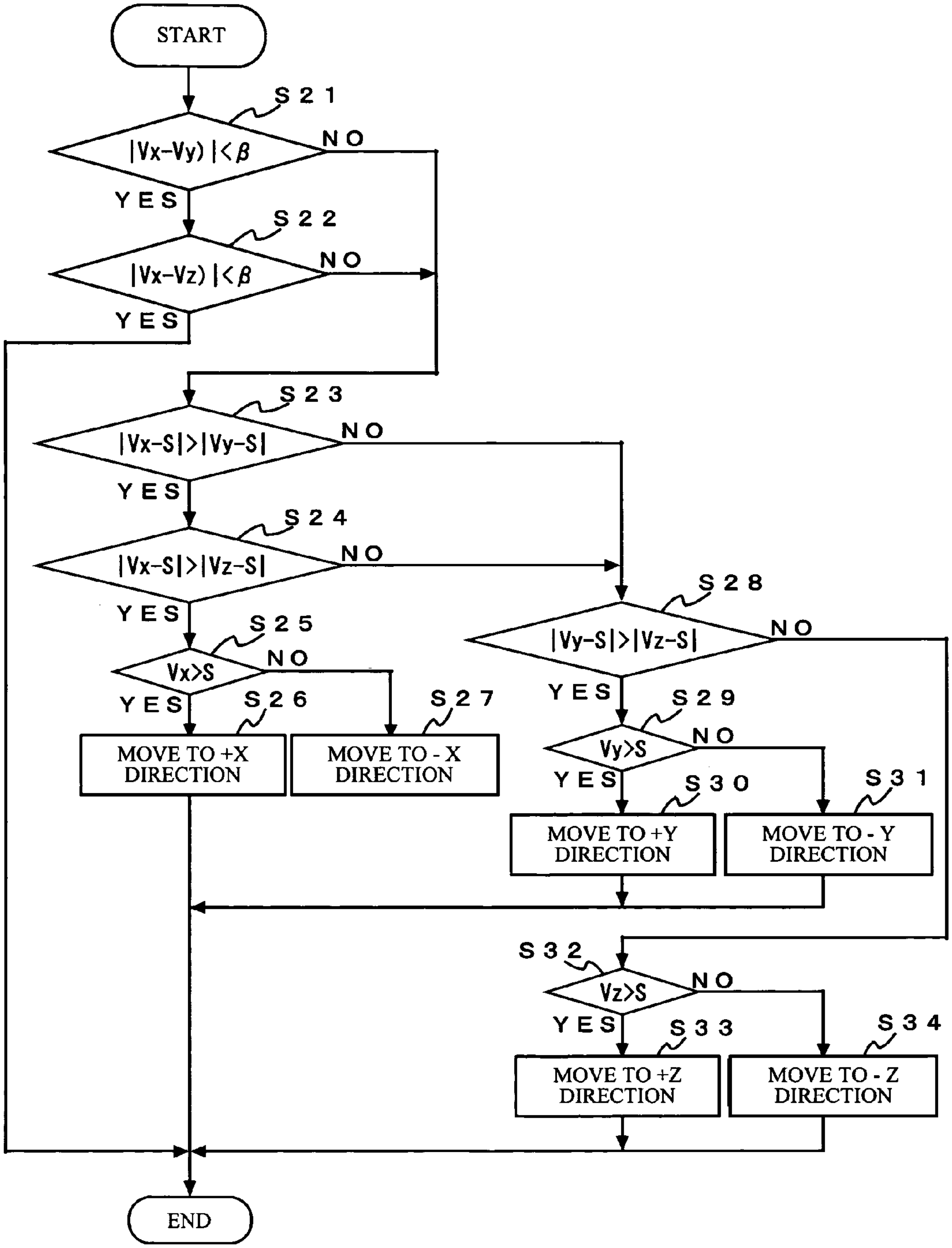
FIG. 12 shows a procedure of determining a manipulation input direction in accordance with the second embodiment of the present invention.

FIG. 12 shows a flowchart describing an operation procedure in accordance with the second embodiment of the present invention. The MPU 21 determines in which direction of the x-axis, y-axis, or z-axis direction the manipulation input has been made, judging from the output voltages (Vx), (Vy), and (Vz) of the pointing device 1. The MPU 21 determines whether an absolute value of the difference between the voltage in the x-axis direction and that in the y-axis direction is larger than a given value β (in step S21), or the difference between the voltage in the x-axis direction and that in the z-axis direction is larger then the given value β (in step S22). The manipulation input is made in one direction, and then the voltage value of the direction is larger than the others. This can determine whether or not the manipulation input has been made, by comparing the difference in the voltage values. If the manipulation input has not been made (Yes in step S21 and Yes in step S22), get out of the procedure.

If the manipulation input has been made, the manipulation direction is determined. First, compare the absolute value of the difference between the voltage value of the x-axis direction and a given value S with the absolute value of the difference between the voltage value of the y-axis direction and the given value S (step S23). If the absolute value of the difference between the voltage value in the x-axis direction and the given value S is larger than the absolute value of the difference between the voltage value in the y-axis direction and the given value S (Yes in step S23), compare the absolute value of the difference between the voltage value in the x-axis direction and the given value S with the absolute value of the difference between the voltage value of the z-axis direction and the given value S (step S24). If the absolute value of the difference between the voltage value in the x-axis direction and the given value S is larger than the absolute value of the difference between the voltage value in the z-axis direction and the given value S (Yes in step S24), it is determined that the manipulation input has been made in the x-axis direction. Next, compare the voltage Vx in the x-axis direction and the given value S (step S25). If the voltage value Vx is larger than the given value S, it is determined that the manipulation input has been made in the positive x-axis direction (step S26). If the given value S is larger than the voltage value Vx, it is determined that the manipulation input has been made in the negative x-axis direction (step S27).

In step S23, if the absolute value of the difference between the voltage value in the y-axis direction and the given value S is larger than the absolute value of the difference between the voltage value in the x-axis direction and the given value S (No in step S23), or in step S24, if the absolute value of the difference between the voltage value of the z-axis direction and the given value S is larger than the absolute value of the difference between the voltage value in the x-axis direction and the given value S (No in step S24), compare the absolute value of the difference between the voltage value in the y-axis direction and the given value S with the absolute value of the difference between the voltage value in the z-axis direction and the given value S (step S28). If the absolute value of the difference between the voltage value in the y-axis direction and the given value S is larger than the absolute value of the difference between the voltage value in the z-axis direction and the given value S (Yes in step S28), it is determined that the manipulation input has been made in the y-axis direction. Then, compare the voltage Vy in the y-axis direction and the given value S (step S29). If the voltage Vy is larger than the given value S, it is determined that the manipulation input has been made in the positive y-axis direction (step S30). If the given value S is larger than the voltage Vy, it is determined that the manipulation input has been made in the negative y-axis direction (step S31).

In step S28, if the absolute value of the difference between the voltage value in the z-axis direction and the given value S is larger than the absolute value of the difference between the voltage value in the y-axis direction and the given value S (No in step S28), it is determined that the manipulation input has been made in the z-axis direction. Then, compare the voltage Vz in the z-axis direction with the given value S (step S32). If the voltage Vz is larger than the given value S, it is determined that the manipulation input has been made in the positive z-axis direction (step S33). If the given value S is larger than the voltage Vz, it is determined that the manipulation input has been made in the negative z-axis direction (step S34).

In this manner, it is possible to point the object in three dimensions with the use of the pointing device used for two dimensions.

Third Embodiment

Figure 13:
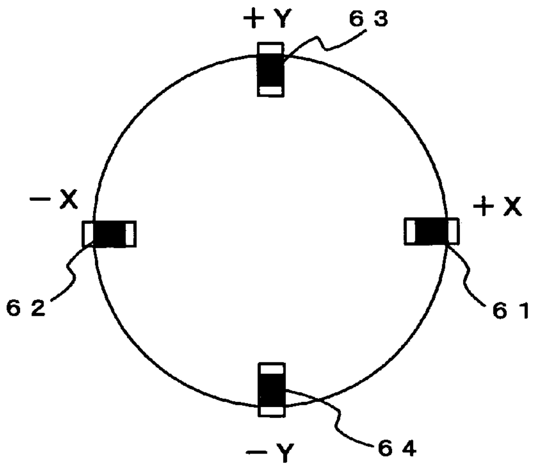
FIG. 13 shows yet another arrangement of hall elements in accordance with a third embodiment of the present invention.

A description will be given of a third embodiment of the present invention. Referring to FIG. 13, four hall elements are arranged at 90-degree intervals on a circle's circumference in accordance with the third embodiment of the present invention. Two pairs of the hall elements are provided, by making a pair of the hall elements facing each other. A hall element 61 is provided in the positive x-axis direction. A hall element 62 is provided in the negative x-axis direction. A hall element 63 is provided in the positive y-axis direction. A hall element 64 is provided in the negative y-axis direction.

Outputs from the pointing device 1 are the voltage +Vx corresponding to +x-axis, the voltage −Vx corresponding to −x-axis, the voltage +Vy corresponding to +y-axis, and the voltage −Vy corresponding to −y-axis. A calculation unit 70 has a different configuration from other calculation units in accordance with the first and second embodiments of the present invention.

Figure 14:
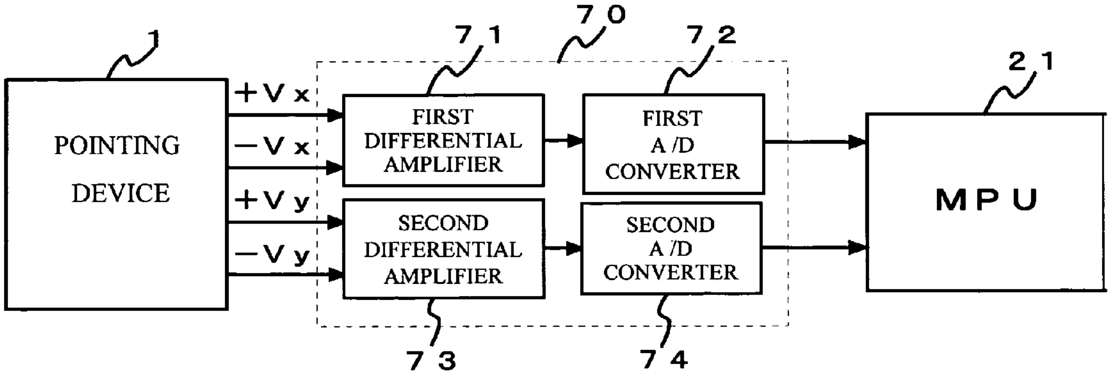
FIG. 14 shows a configuration of the calculation unit in accordance with the third embodiment of the present invention.

FIG. 14 shows a configuration of the calculation unit 70. The calculation unit 70 includes a first differential amplifier 71, a second differential amplifier 73, a first A/D converter 72, and a second A/D converter 74. Inputs into the calculation unit 70 are the voltages (+Vx) and (−Vx) in the X direction, and the voltages (+Vy) and (−Vy) in the Y direction. The first differential amplifier 71 amplifies differences between the voltages (+Vx) and (−Vx) and the first A/D converter 72 converts the output from the first differential amplifier 71 into the digital signal. The second differential amplifier 73 amplifies differences between the voltages (+Vy) and (−Vy) and the second A/D converter 74 converts the outputs from the second differential amplifier 73 into the digital signal.

The MPU 21 calculates the difference between the differential output value between the hall elements 61 and 62 in the x-axis direction and the differential output value between the hall elements 63 and 64 in the y-axis direction. If the difference is equal to or smaller than a given threshold level, it is determined that the manipulation input has been made in the z-axis direction. If the aforementioned difference is larger than the given threshold level, it is determined that the manipulation direction is the x-axis or y-axis direction.

Figure 15:
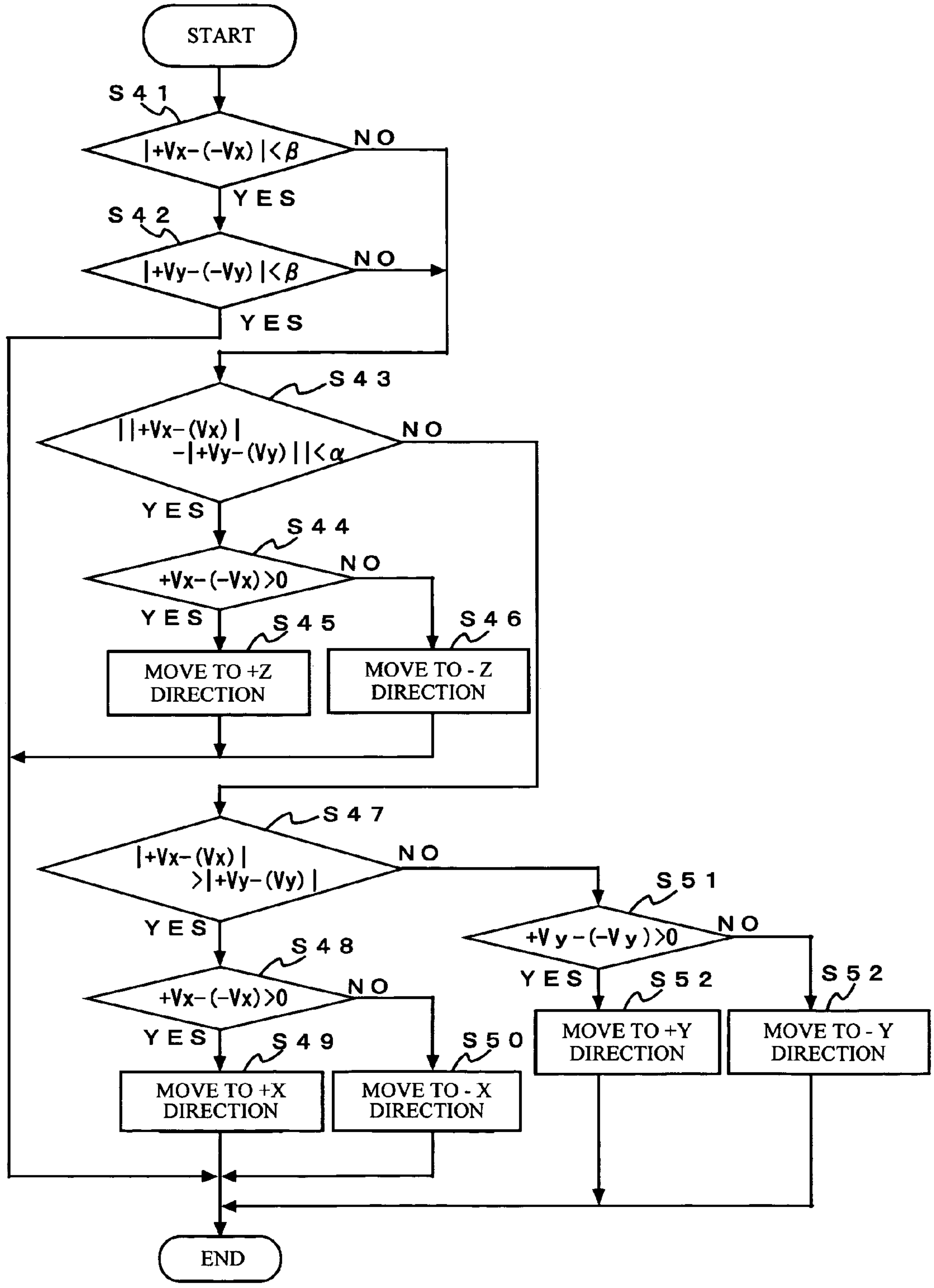
FIG. 15 shows a procedure of determining a manipulation input direction in accordance with the third embodiment of the present invention.

FIG. 15 shows a flowchart describing an operation procedure in accordance with the third embodiment of the present invention. The MPU 21 determines whether the manipulation input has been made judging from the output voltages (+Vx), (−Vx), (+Vy), and (−Vy). The determination is made whether |+Vx−(−Vx)|, the absolute value of the differential output in the x-axis direction is larger than the given value β (step S41), or |+Vy−(−Vy)|, the absolute value of the differential output in the y-axis direction is larger than the given value β (step S42). The manipulation input has been made in one direction, and consequently the voltage value of the direction is larger. It is thus possible to determine whether the manipulation input has been made by comparing the difference in the voltage values. If the manipulation input has not been made (Yes in step S41 and Yes in step S42), get out of this procedure.

If it is determined that the manipulation input has been made, the manipulation direction is determined next. Calculate the difference between the absolute value of the differential output value |+Vx−(−Vx)| in the x-axis direction and the absolute value of the differential output value |+Vy−(−Vy)| in the y-axis direction. Then, compare the difference with a given value α (step S43). If the absolute value of the difference between the differential output value in the x-axis direction and that in the y-axis direction is smaller than the given value α (Yes in step S43), it is determined that the manipulation input has been made in the z-axis direction. Then, compare the voltage value in the +x-axis direction +Vx with that in the −x-axis direction −Vx (step S44). If the voltage value of the +x-axis direction +Vx is larger than the voltage value of the −x-axis direction −Vx (Yes in step S44), it is determined that the manipulation input has been made in the +z direction (step S45). If the voltage value of the −x-axis direction −Vx is larger than the voltage value of the +x-axis direction +Vx (No in step S44), it is determined that the manipulation input has been made in the −z direction (step S46).

If the absolute value of the difference between the differential output value in the x-axis direction and that in the y-axis direction is smaller than a given value α (No in step S43), it is determined that the manipulation input has been made in the x-axis direction or y-axis direction. Then, compare the absolute value of the differential output in the x-axis direction |+Vx−(−Vx)| with the absolute value of the differential output in the y-axis direction |+Vy−(−Vy)| (in step S47). If the absolute value of the differential output in the x-axis direction is larger than the absolute value of the differential output in the y-axis direction (Yes in step S47), it is determined that the manipulation input has been made in the x-axis direction. Then, compare the voltage value +Vx in the +x-axis direction with the voltage value −Vx in the −x-axis direction (step S48). If the voltage value +Vx in the +x-axis direction is larger than the voltage value −Vx of the −x-axis direction (Yes in step S48), it is determined that the manipulation input has been made in the +x direction (step S49). If the voltage value −Vx in the −x-axis direction is larger than the voltage value +Vx in the +x-axis direction (No in step S48), it is determined that the manipulation input has been made in the −z direction (step S50).

In addition, the absolute value of the differential output in the y-axis direction is larger than that of the differential output in the x-axis direction (No in step 47), it is determined that the manipulation input has been made in the y-axis direction. Then, compare the voltage value +Vy in the +y-axis direction with the voltage value −Vy in the −y-axis direction (in step S51). If the voltage value +Vy in the +y-axis direction is larger than the voltage value −Vy in the −y-axis direction (Yes in step S51), it is determined that the manipulation input has been made in the +y direction (step S52). If the voltage value −Vy in the −y-axis direction is larger than the voltage value +Vy in the +y-axis direction (No in step S51), it is determined that the manipulation input has been made in the −y direction (step S52).

It is thus possible to point the object in three dimensions with the use of the pointing device used for two dimensions, in accordance with the third embodiment of the present invention.

The present invention is not limited to the above-mentioned embodiments, and other embodiments, variations and modifications may be made without departing from the scope of the present invention.

The present invention is based on Japanese Patent Application No. 2004-209161 filed on Jul. 15, 2004, the entire disclosure of which is hereby incorporated by reference.

What is claimed is:

1. A pointing device, comprising:

hall elements that detect inclinations of a single magnet in first, second and third directions in a two-dimensional plane, where the first, second and third directions correspond to three dimensions of a three-dimensional space, the hall elements being arranged along the first, second and third directions in the two-dimensional plane; and a control unit that determines a pointing direction in the three-dimensional space based on output voltages of the hall elements depending on the inclinations of the magnet.

2. The pointing device as claimed in claim 1, wherein the hall elements are arranged so that a pair of the hall elements is arranged symmetrically facing each other with respect to a same reference point in each of the first, second and third directions.

3. The pointing device as claimed in claim 1, wherein:

the hall elements are arranged symmetrically with respect to a reference point, facing each other in the first and second directions; and the control unit determines that inclination of the magnet in the third direction has been changed, when a difference between a first differential output voltage of the pair of hall elements provided in the first direction and a second differential output voltage of the pair of hall elements provided in the second direction is smaller than a given threshold value.

4. A method of determining three-dimensional inclination of a magnet, the method comprising:

determining three output voltages due to the three-dimensional inclination of the magnet, the three output voltages occurring in each of three pairs of hall elements arranged in a plane;

comparing each of the three output voltages with a threshold voltage; and comparing magnitudes of the output three voltages with each other and sign of each of the three output voltage to determine a direction of movement, if at least one of the three output voltages is bigger than the threshold voltage.

* * * * *